March 17, 1953  F. DOVE  2,632,095
HEADLIGHT LENS
Filed Jan. 4, 1950

INVENTOR.
Fred Dove
BY Mason, Fenwick, & Lawrence
ATTORNEYS

Patented Mar. 17, 1953

2,632,095

UNITED STATES PATENT OFFICE 2,632,095

HEADLIGHT LENS

Fred Dove, Atlanta, Ga., assignor of one-tenth to Luther Alverson, Atlanta, Ga.

Application January 4, 1950, Serial No. 136,828

9 Claims. (Cl. 240—41.4)

The present invention relates in general to headlights for automobiles and the like, and more particularly to automobile headlight lenses of the non-glare variety constructed so as to present a non-glare face to approaching vehicles.

A common problem occurring in connection with automobile headlights is that of providing a high intensity illumination of the roadway directly ahead of the automobile with which they are associated, while reducing intensity of the light scattered or reflected across the center of the roadway in the path of drivers of approaching vehicles. This is necessary as the illumination intensity of headlights designed to comply with minimum safety requirements is sufficient to effect substantial blinding of approaching drivers from rays scattered or reflected across the center of the roadway.

Many complex and cumbersome attachments for reducing this spurious illumination intensity have been proposed. One method commonly employed to reduce headlight glare in the direction of approaching vehicles is to provide a dimmer lamp in the headlight of less intensity than the normal-driving headlight lamp and disposed above and to one side of the optical axis of the lens. Thus when the dimmer lamp is energized, a lower intensity illuminating beam is produced, which is directed downwardly and toward the right side of the roadway. This system is subject to some objection, however, as illumination directly ahead of the driver is diminished to a point that safe distant object-illumination is no longer available.

Other means have been proposed, such as providing opaque louvers or shutters in the headlight unit operative to deflect the light rays downwardly for diminishing glare in the direction of approaching vehicles. This, however, also reduces forward illumination to the extent that clear illumination of objects two hundred feet or so ahead of the automobile, as required for optimum safe driving conditions, is no longer attainable. Likewise, such louver or shutter assemblies generally occur in the form of attachments to be incorporated with the headlight unit and accordingly involve an additional relatively high expense outlay.

Another problem arising in connection with vehicular illumination is the lack of distinctiveness of the several headlamps on an automobile, such that when one of the headlamps is blacked out, the location of the properly operating headlamp relative to the automobile is not readily discernible from approaching vehicles.

It is, therefore, an object of the present invention to provide a novel headlight lens for vehicles and the like, which is operative to effect substantially undiminished illumination directly ahead of the automobile, while substantially obviating glare in the direction of approaching vehicles.

Another object of the present invention is the provision of a novel headlamp lens for automobiles and the like, which directs a substantially unattenuated illuminating beam along the optical axis of the system directly ahead of the automobile while diminishing scattered light radiation in the direction of approaching vehicle lanes to present a non-glare face to approaching vehicles.

Another object of the present invention is the provision of a novel headlamp lens for automobiles and the like, having means for reducing glare in the direction of approaching vehicles, which are integrally incorporated into the headlamp lens, which are of relatively inexpensive and simple construction, which are readily adaptable for mass production, and which are highly resistant to misalignment from shock.

Another object of the present invention is the provision of a novel headlamp lens for automobiles and the like, in which the position of the headlamp relative to the automobile is distinctively indicated in accordance with a preselected color coding system.

Other objects, advantages and capabilities of the present invention will become apparent from the following detailed description, taken in conjunction with the accompanying drawings, wherein only a preferred embodiment is shown.

Figure 1:
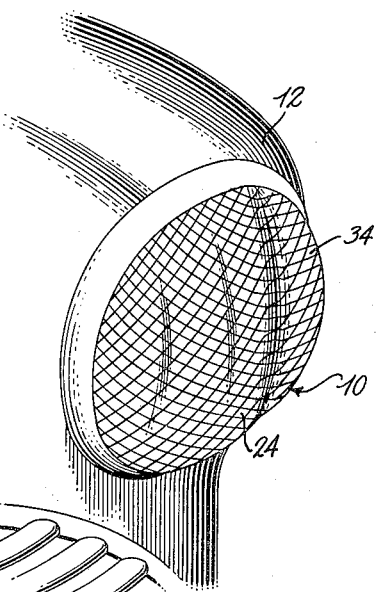
Figure 1 is a perspective view of an automobile headlamp embodying the present invention, illustrated in its relative relation to associated parts of an automobile.

Referring to the drawings, in which like reference characters designate corresponding parts throughout the several figures, reference character 10 generally designates an automobile headlight unit mounted in the fender 12 or otherwise suitably mounted on the automobile. The headlight unit illustrated in Figure 1, disposed in the fender 12, is the headlight on the lefthand side of the automobile facing in the direction of travel of the automobile.

The headlight 10 comprises a suitable casing 14, which may, for example, be the casing unit of a conventional sealed beam type headlight. The casing 14 is provided with an inwardly disposed polished reflector surface 16 arranged in the form of a parabola, with a suitable lamp schematically indicated at 18, mounted on a suitable lamp base 20 disposed at the focal point of the parabolic reflector 16. An additional dimmer lamp element, schematically indicated at 22, may likewise be incorporated in the headlamp unit.

The headlight lens is indicated at 24 and is formed in a generally convex shape. The lens 24 comprises a transparent discal body intercoupled with the casing 14 by a suitable mounting rim 26. The headlight lens 24 in the preferred embodiment, is divided with a pair of vertically arranged light divider fins 28 and 30 integrally formed, as by molding, with the inner face 32 of the lens 24. The vertically arranged fins 28 and 30 are disposed to the lefthand side of the principal optical axis or medial vertical plane extending through the lens, and extend rearwardly from the face 32 in angularly divergent relation to the principal optical axis forming an acute angle therewith rearwardly of the lens. These divider fins 28 and 30 are constructed of the same material as the lens 24 and form light divider elements effecting reflection of a substantial portion of the spurious light beams incident thereto back along the principal optical axis of the lens. Only a slight amount of the light incident to the divider fins 28 and 30 will be transmitted through the fins and permitted to travel on in the direction of an approaching highway lane, that is, to the lefthand side of the automobile.

The planar divider fins 28 and 30 are disposed at angles relative to the optical axis and the lamp 18 so as to reflect the major portion of the light incident thereto in substantial alignment with the principal optical axis of the lens. Light impinging upon the inner face 30' of the outermost divider fin 30 will be reflected toward the outer face 28'' of the innermost divider fin 28, and thence reflected forwardly within the substantially columnated light beam reflected from the parabolic surface 16 and transmitted through the uninterrupted portion of the lens. Light from the lamp 18 impinging on the inner face 28' of the divider fin 28 will merely be reflected across the principal optical axis of the system toward the righthand side of the lane in which the automobile is traveling. The outermost divider fin 30 is of such a width as to extend rearwardly of the surface of the lens 24 sufficient to intercept substantially all direct light rays emanating from the lamp 18 toward the extreme righthand area of the lens, as viewed in Figures 2 and 3.

Figure 2:
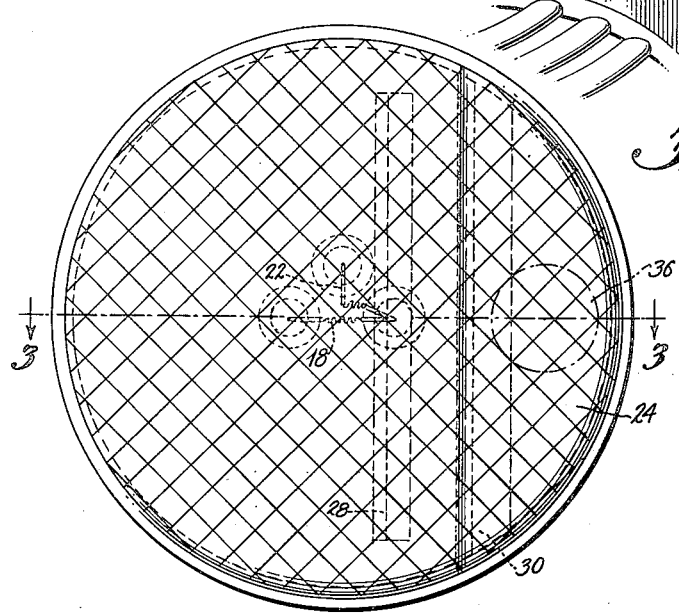
Figure 2 is a front elevation of an automobile headlamp embodying the present invention.
Figure 3:
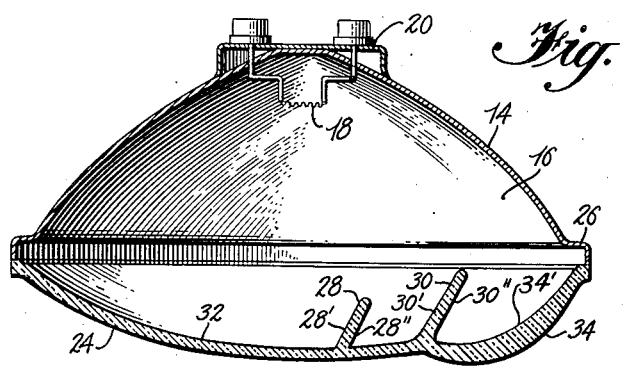
Figure 3 is a horizontal transverse section of a headlamp lens embodying the present invention mounted in an automobile headlamp, viewed along the lines 3—3 of Figure 2.

The portion of the discal body forming the lens 24 extending between the base of the divider fin 30 and the righthand edge of the discal lens 24, as viewed in Figures 2 and 3, is shaped to form a short focal length image-forming element 34 of considerably greater convexity than the lens 24. The outer face 30'' of the divider fin 30 and the inner face 34' of the short focal length element 34, are provided with a translucent color coating corresponding to a preselected color code. For example, the lefthand headlight lens of the automobile, facing forwardly of the automobile, may be provided with a green coating, while the righthand headlight lens may be provided with a red coating. The image-forming element 34 at the near edge of the lens will image the light incident thereto emanating from the lamp 18, and a portion of that reflected from the parabolic surface 16, in the form of a colored area or spot, indicated by broken line at 36, of higher intensity than the portion of the columnated beam emanating from the lens 24, visible from approaching vehicles, which will be of the color of the coating. Thus, if the righthand headlight of the automobile is blacked out, the illuminated headlamp on the lefthand side of the car will exhibit the green imaged spot indicating to approaching drivers that the single illuminated headlamp is on the side of the car nearest to them. Conversely, if the lefthand headlight is out, the single illuminated headlamp will exhibit a red spot in the near corner of the headlamp, thereby indicating to approaching drivers that the operative lamp is on the far side of the approaching automobile.

The structure of the headlamp lens is, therefore, such that the portion of the columnated beam emanating from the lamp 18 and transmitted through the uninterrupted or righthand half of the headlamp, viewed in the direction of travel of the automobile, will be projected forwardly substantially undiminished in intensity. The portion of the light incident to the half of the lens 24 nearest approaching drivers, however, will be divided and diffused by the divider fins 28 and 30. These rays incident to the fins 28 and 30 will be reflected from faces of the fins either in substantially parallel relation to the principal optical axis of the headlamp or across the principal optical axis toward the righthand side of the roadway. Only a small portion of the light incident to the fins 28 and 30 will be transmitted through the fins and permitted to travel in the direction of vehicles in approaching roadway lanes, and this light will be sufficiently attenuated during transmission through the fins 28 and 30 to diminish their intensity to harmless proportions. Likewise, rays coupled through the colored face 30'' of the outermost fin 30 and the highly convergent imaging area 34 of the headlamp lens 24 will be imaged in the form of a colored spot to indicate the side of the automobile on which the particular headlamp is disposed.

It will be apparent from the above description that a novel automobile headlamp has been provided, permitting substantially unattenuated illumination of the roadway directly ahead of an automobile in which the headlamp is mounted, while diminishing the intensity of illumination in the direction of approaching vehicles sufficient to present a safe non-glare face to approaching drivers.

While only one particular embodiment of the invention has been shown and described, it is distinctly understood that this invention is not limited thereto but that various modifications may be made in the invention without departing from the spirit and scope thereof and it is desired, therefore, that only such limitations shall be placed thereon as are imposed by the prior art and are set forth in the appended claims.

What is claimed is:

1. A headlight lens, comprising a transparent discal body, light divider elements comprising transparent fins integrally formed on said body and extending rearwardly thereof, said light divider elements being disposed entirely to one side of the center of said body and arranged in vertical planes inclined angularly to the optical axis of said body for redirecting a portion of light rays emanating from a location along the optical axis of said lens, and image-forming means formed adjacent said divider elements for imaging a distinctive spot of the light transmitted therethrough.

2. A headlight lens, comprising a transparent discal body having a rear face, light divider elements comprising transparent fins integrally formed on the rear face of said body and extending rearwardly thereof, said light divider elements being disposed entirely to one side of the medial vertical axis of said body and arranged in vertical planes inclined angularly to the optical axis of said body for redirecting a portion of light rays emanating from a rearwardly disposed point along the optical axis of said lens into substantial alignment with the optical axis, and image-forming means formed of said body adjacent said divider elements for imaging a distinctive spot of the light transmitted therethrough.

3. A headlight lens, comprising a transparent discal body having a rear face, light divider elements comprising transparent planar fins integrally formed on the rear face of said body and extending rearwardly thereof, said light divider elements being disposed entirely to one side of the medial vertical axis of said body and arranged in vertical planes inclined angularly to the optical axis of said body for deflecting a portion of light rays emanating from a rearwardly disposed location on the optical axis into substantial alignment with the optical axis, and short focal length image-forming means formed of said body adjacent an edge thereof outwardly of said light divider elements for imaging a spot of the light transmitted therethrough and having means associated therewith for imparting a distinctive color to said imaged spot.

4. In a headlight, a headlight lens comprising a transparent discal body, said body having light divider elements integrally formed therewith disposed wholly to one side of the center of said body and extending rearwardly therefrom, said light divider elements comprising vertically arranged transparent fins inclined at a rearwardly diverging angle relative to the optical axis of said lens to reflect a portion of the light rays incident thereto approaching at an angle to the optical axis of said lens into substantial alignment with said optical axis, and image-forming means formed of said body and disposed adjacent said divider elements and an edge of said body for imaging a distinctive spot of the light transmitted therethrough.

5. In a headlight, a headlight lens comprising a transparent convexly curved body, said body having light divider elements integrally formed therewith disposed wholly to one side of the medial vertical axis of said body and extending rearwardly therefrom, said light divider elements comprising vertically arranged transparent fins arranged in vertical planes inclined at a rearwardly diverging angle relative to the optical axis of said lens to divide light rays incident thereto emanating from a rearward location along the optical axis into a reflected portion redirected into substantial alignment with said optical axis and a transmitted portion substantially attenuated in intensity, and image-forming means formed of said body and disposed adjacent and radially outwardly of the most remote of said elements for imaging a visible distinctive spot of the light transmitted therethrough.

6. In a headlight, a headlight lens comprising a transparent convexly curved body, the portion of said body disposed to one side of its medial vertical axis being formed as a substantially unobstructed circular segment, the remainder of said body having light divider elements integrally formed therewith extending rearwardly from said body, said light divider elements comprising laterally spaced vertically arranged transparent fins substantially co-extensive in length with said body disposed in planes inclined at a rearwardly diverging angle relative to the optical axis of said lens to redirect a portion of light rays emanating from a location along said optical axis in divergent relation therewith into convergent relation with said optical axis, and image-forming means formed of said body located radially outwardly of the outermost of said elements adjacent the edge of said body for imaging a visible distinctive spot of the light transmitted therethrough.

7. In a headlight, a headlight lens comprising a transparent convexly curved body, the portion of said body disposed to one side of its medial vertical axis being formed as a substantially unobstructed circular segment, the remainder of said body having light divider elements integrally formed therewith extending rearwardly from said body, said light divider elements comprising laterally spaced vertically arranged transparent fins co-extensive in length with said body disposed in spaced vertical planes inclined at a rearwardly diverging angle relative to the optical axis of said lens to redirect a portion of light rays emanating from a location along said optical axis in divergent relation therewith into convergent relation with said optical axis, and short focal length imaging means formed of said body and disposed between the outermost of said elements and the adjacent edge of said body for imaging a visible distinctive spot of the light transmitted therethrough.

8. In a headlight, a headlight lens comprising a transparent convexly curved body, the portion of said body disposed to one side of its medial vertical axis being formed as a substantially unobstructed circular segment, the remainder of said body having light divider elements integrally formed therewith extending rearwardly from said body, said light divider elements comprising laterally spaced vertically arranged transparent fins co-extensive in length with said body disposed in spaced vertical planes inclined at a rearwardly diverging angle relative to the optical axis of said lens to divide light rays emanating from a location along said optical axis in divergent relation therewith into a reflected portion re-directed into convergent relation with said optical axis and a transmitted portion substantially attenuated in intensity, and short focal length imaging means formed of said body and disposed between the outermost of said elements and the adjacent edge of said body for imaging a visible spot of the light transmitted therethrough, said imaging means having means associated therewith for imparting a distinctive color to said image spot of light.

9. In a headlight, a headlight lens comprising a transparent convexly curved body, the portion of said body disposed to one side of its medial vertical axis being formed as a substantially unobstructed circular segment, the remainder of said body having light divider elements integrally formed therewith extending rearwardly from said body, said light divider elements comprising laterally spaced vertically arranged transparent fins co-extensive in length with said body disposed in spaced vertical planes inclined at a rearwardly diverging angle relative to the optical axis of said lens to divide light rays emanating from a location along said optical axis in divergent relation therewith into a reflected portion re-directed into convergent relation with said optical axis and a transmitted portion substantially attenuated in intensity, and short focal length imaging means formed of said body and disposed between the outermost of said elements and the adjacent edge of said body for imaging a visible spot of the light transmitted therethrough, said imaging means having a coating applied thereto for imparting a distinctive color to the spot imaged thereby.

FRED DOVE.

REFERENCES CITED

The following references are of record in the file of this patent:

UNITED STATES PATENTS

| Number | Name | Date |
|---|---|---|
| 1,331,422 | Donaldson | Feb. 17, 1920 |
| 1,399,143 | Moriarty | Dec. 6, 1921 |
| 1,413,415 | McPeek | Apr. 18, 1922 |
| 1,445,282 | Allison | Feb. 13, 1923 |
| 1,525,120 | Dufek | Feb. 3, 1925 |
| 1,536,146 | Saffert | May 5, 1925 |
| 1,593,849 | Reynolds | July 27, 1926 |
| 1,744,725 | Arbuckle | Jan. 28, 1930 |